United States Patent
Valencia

(10) Patent No.: US 9,739,528 B2
(45) Date of Patent: Aug. 22, 2017

(54) METHOD AND SYSTEM FOR STARTING UP A DISTILLATION TOWER

(71) Applicant: Jaime A. Valencia, Houston, TX (US)

(72) Inventor: Jaime A. Valencia, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 253 days.

(21) Appl. No.: 14/661,621

(22) Filed: Mar. 18, 2015

(65) Prior Publication Data

US 2015/0300735 A1 Oct. 22, 2015

Related U.S. Application Data

(60) Provisional application No. 61/982,689, filed on Apr. 22, 2014.

(51) Int. Cl.
*F25J 3/06* (2006.01)
*F25J 3/02* (2006.01)

(52) U.S. Cl.
CPC ........... *F25J 3/0209* (2013.01); *F25J 3/0233* (2013.01); *F25J 3/0266* (2013.01); *F25J 3/0295* (2013.01); *F25J 2200/02* (2013.01); *F25J 2200/30* (2013.01); *F25J 2200/50* (2013.01); *F25J 2200/74* (2013.01); *F25J 2205/04* (2013.01); *F25J 2205/20* (2013.01); *F25J 2210/60* (2013.01); *F25J 2235/60* (2013.01); *F25J 2280/10* (2013.01); *F25J 2280/40* (2013.01); *F25J 2290/40* (2013.01); *Y02C 10/12* (2013.01)

(58) Field of Classification Search
CPC F25J 3/0695; F25J 3/061; F25J 3/0266; F25J 3/067; F25J 3/0209; F25J 3/08; F25J 3/0233; F25J 3/0635; F25J 2220/60; F25J 2220/66; F25J 2220/82; F25J 2205/04; F25J 2210/60; F25J 2280/40; F25J 2290/40

See application file for complete search history.

(56) References Cited

U.S. PATENT DOCUMENTS

| | | | |
|---|---|---|---|
| 4,383,841 A | 5/1983 | Ryan et al. | 62/17 |
| 4,417,909 A | 11/1983 | Weltmer, Jr. | 62/12 |
| 4,462,814 A | 7/1984 | Holmes et al. | 62/17 |

(Continued)

OTHER PUBLICATIONS

U.S. Appl. No. 14/516,683, filed Oct. 17, 2014, Valencia, J. A. et al.

(Continued)

*Primary Examiner* — Frantz Jules
*Assistant Examiner* — Brian King
(74) *Attorney, Agent, or Firm* — ExxonMobil Upstream Research Company Law Department

(57) ABSTRACT

The present disclosure provides method for clean methane startup of a distillation tower. The method includes maintaining a rectifier section and a lower section in the distillation tower, feeding stream to the lower section, directly feeding methane to at least one of the rectifier section and a rectifier section outlet line of the rectifier section when a contaminant concentration of the contaminant exiting as a vapor in an upper portion of the lower section is outside of a predetermined concentration and introducing the vapor from the lower section to the rectifier section when the contaminant concentration exiting the upper portion of the lower section is within the predetermined concentration.

21 Claims, 4 Drawing Sheets

(56) References Cited

U.S. PATENT DOCUMENTS

| | | | |
|---|---|---|---|
| 4,533,372 A | 8/1985 | Valencia et al. | 62/12 |
| 4,761,167 A | 8/1988 | Nicholas et al. | 62/17 |
| 4,923,493 A | 5/1990 | Valencia et al. | 62/13 |
| 5,062,270 A | 11/1991 | Haut | 62/12 |
| 5,120,338 A | 6/1992 | Potts et al. | 62/12 |
| 5,265,428 A * | 11/1993 | Valencia | B01D 3/18 |
| | | | 202/158 |
| 5,819,555 A | 10/1998 | Engdahl | 62/637 |
| 5,956,971 A | 9/1999 | Cole et al. | 62/623 |
| 6,053,007 A | 4/2000 | Victory et al. | 62/619 |
| 6,082,133 A | 7/2000 | Barclay et al. | 62/619 |
| 6,516,631 B1 | 2/2003 | Trebble | 62/630 |
| 6,755,965 B2 | 6/2004 | Pironti et al. | 208/347 |
| 7,325,415 B2 | 2/2008 | Amin et al. | 62/541 |
| 2008/0034789 A1 | 2/2008 | Fieler et al. | 62/623 |
| 2009/0266107 A1 * | 10/2009 | Singh | B01D 3/14 |
| | | | 62/617 |
| 2010/0018248 A1 | 1/2010 | Fieler et al. | 62/617 |
| 2012/0031144 A1 | 2/2012 | Northrop et al. | 62/617 |
| 2012/0079852 A1 | 4/2012 | Northrop et al. | 62/620 |
| 2012/0125043 A1 * | 5/2012 | Cullinane | B01D 7/02 |
| | | | 62/620 |
| 2012/0204599 A1 | 8/2012 | Northrop et al. | 62/617 |
| 2012/0279728 A1 | 11/2012 | Northrop et al. | 166/401 |
| 2013/0074541 A1 | 3/2013 | Kaminsky et al. | 62/601 |
| 2013/0098105 A1 | 4/2013 | Northrop | 62/617 |
| 2014/0137599 A1 | 5/2014 | Oelfke et al. | 62/619 |
| 2014/0338395 A1 | 11/2014 | Oelfke et al. | 62/620 |
| 2015/0013377 A1 | 1/2015 | Oelfke | 62/602 |

OTHER PUBLICATIONS

U.S. Appl. No. 14/516,686, filed Oct. 17, 2014, Valencia, J. A.
U.S. Appl. No. 14/516,689, filed Oct. 17, 2014, Cullinane, J. T. et al.
U.S. Appl. No. 14/516,705, filed Oct. 17, 2014, Valencia, J. A. et al.
U.S. Appl. No. 14/516,709, filed Oct. 17, 2014, Valencia, J. A.
U.S. Appl. No. 14/516,713, filed Oct. 17, 2014, Valencia, J. A. et al.
U.S. Appl. No. 14/516,717, filed Oct. 17, 2014, Valencia, J. A. et al.
U.S. Appl. No. 14/516,718, filed Oct. 17, 2014, Valencia, J. A.
U.S. Appl. No. 14/516,726, filed Oct. 17, 2014, Valencia, J. A. et al.
U.S. Appl. No. 14/516,731, filed Oct. 17, 2014, Valencia, J. A. et al.

* cited by examiner

METHOD AND SYSTEM FOR STARTING UP A DISTILLATION TOWER

CROSS REFERENCE TO RELATED APPLICATIONS

This application claims the priority benefit of U.S. patent application No. 61/982,689 filed Apr. 22, 2014 entitled METHOD AND SYSTEM FOR STARTING UP A DISTILLATION TOWER, the entirety of which is incorporated by reference herein.

BACKGROUND

Fields of Disclosure

The disclosure relates generally to the field of fluid separation in a distillation tower. More specifically, the disclosure relates to the startup of a distillation tower.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as admissions of prior art.

The production of natural gas hydrocarbons, such as methane and ethane, from a reservoir oftentimes carries with it the incidental production of non-hydrocarbon gases. Such gases include contaminants, such as at least one of carbon dioxide ("$CO_2$"), hydrogen sulfide ("$H_2S$"), carbonyl sulfide, carbon disulfide, and various mercaptans. When a feed stream being produced from a reservoir includes these contaminants mixed with hydrocarbons, the stream is oftentimes referred to as "sour gas."

Many natural gas reservoirs have relatively low percentages of hydrocarbons and relatively high percentages of contaminants. Contaminants may act as a diluent and lower the heat content of hydrocarbons. Additionally, in the presence of water some contaminants can become quite corrosive.

It is desirable to remove contaminants from a stream containing hydrocarbons to produce sweet and concentrated hydrocarbons. Specifications for pipeline quality natural gas typically call for a maximum of 2-4% $CO_2$ and ¼ grain $H_2S$ per 100 scf (4 ppmv) or 5 mg/Nm3 $H_2S$. Specifications for lower temperature processes such as natural gas liquefaction plants or nitrogen rejection units typically require less than 50 ppm $CO_2$.

The separation of contaminants from hydrocarbons is difficult and consequently significant work has been applied to the development of hydrocarbon/contaminant separation methods. These methods can be placed into three general classes: absorption by solvents (physical, chemical, and hybrids), adsorption by solids, and distillation.

Separation by distillation of some mixtures can be relatively simple and, as such, is widely used in the natural gas industry. However, distillation of mixtures of natural gas hydrocarbons, primarily methane, and one of the most common contaminants in natural gas, carbon dioxide, can present significant difficulties. Conventional distillation principles and conventional distillation equipment are predicated on the presence of only vapor and liquid phases throughout the distillation tower. The separation of $CO_2$ from methane by distillation involves temperature and pressure conditions that result in solidification of $CO_2$ if a pipeline or better quality hydrocarbon product is desired. The required temperatures are cold temperatures typically referred to as cryogenic temperatures.

Certain cryogenic distillations can overcome the above mentioned difficulties. These cryogenic distillations provide the appropriate mechanism to handle the formation and subsequent melting of solids during the separation of solid-forming contaminants from hydrocarbons. The formation of solid contaminants in equilibrium with vapor-liquid mixtures of hydrocarbons and contaminants at particular conditions of temperature and pressure takes place in a controlled freeze zone section. A stripper section may also help separate the contaminants from the hydrocarbons but the stripper section is operated at a temperature and pressure that does not form solid.

Disadvantages may arise when using cryogenic distillations in a distillation tower if the appropriate temperature and/or composition profiles are not achieved by the end of startup of the distillation tower. The appropriate temperature and composition profiles may vary depending on the section of the distillation tower. Disadvantages may include the formation of solids within the distillation tower but outside of the controlled freeze zone section. Disadvantages may also include undue accumulation of solids in the controlled freeze zone section. Either of these two disadvantages may interfere with the proper operation of the controlled freeze zone section and/or the effective separation of methane from contaminants.

A need exists for improved technology for starting-up the distillation tower so as to achieve appropriate temperature and/or composition profiles in the distillation tower by the end of startup (i.e., by normal operation) of the distillation tower.

SUMMARY

The present disclosure provides a system and method for starting-up a distillation tower, among other things.

A method for startup of a distillation tower may comprise maintaining a rectifier section in the distillation tower, maintaining a lower section in the distillation tower that is configured to form solids from a contaminant within a stream that enters the distillation tower, feeding the stream to the lower section, directly feeding methane to at least one of the rectifier section and a rectifier section outlet line of the rectifier section when a contaminant concentration of the contaminant exiting as a vapor in an upper portion of the lower section is outside of a predetermined concentration, and introducing the vapor from the lower section to the rectifier section when the contaminant concentration exiting the upper portion of the lower section is within the predetermined concentration.

A method for startup of a distillation tower may comprise maintaining a rectifier section in the distillation tower, maintaining a lower section in the distillation tower that is configured to form solids from a contaminant within a stream that enters the distillation tower, feeding the stream to the lower section, directly feeding methane to at least one of the rectifier section and a rectifier section outlet line of the rectifier section when a contaminant concentration of the contaminant exiting as a vapor in an upper portion of the lower section is outside of a predetermined concentration, introducing the vapor from the lower section to the rectifier section when the contaminant concentration exiting the upper portion of the lower section is within the predetermined concentration, and producing hydrocarbons from the distillation tower.

A distillation tower for startup may comprise a rectifier section, a lower section configured to form solid from contaminant within a stream, and a storage unit holding methane that fluidly connects to at least one of the rectifier section and a rectifier section outlet line of the rectifier section, wherein the lower section introduces the contaminant exiting as a vapor from an upper portion of the lower section to the rectifier section when a contaminant concentration of the vapor exiting the upper portion of the lower section is within a predetermined concentration and wherein the lower section does not introduce the vapor from the lower section to the rectifier section when the contaminant concentration exiting the upper portion of the lower section is outside of the predetermined concentration.

The foregoing has broadly outlined the features of the present disclosure in order that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
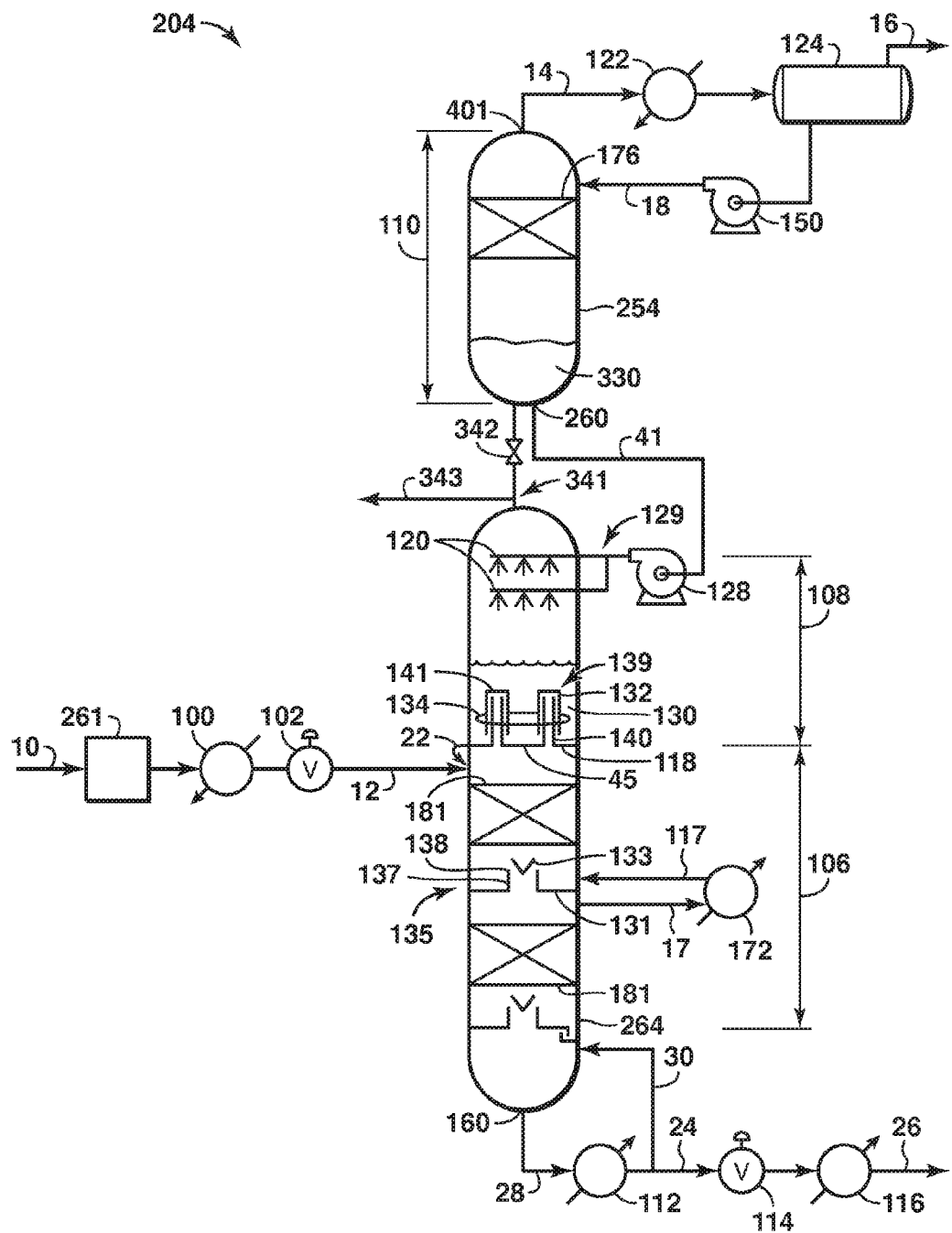
FIG. 1 is a schematic diagram of a distillation tower.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

As referenced in this application, the terms "stream," "gas stream," "vapor stream," and "liquid stream" refer to different stages of a feed stream as the feed stream is processed in a distillation tower that separates methane, the primary hydrocarbon in natural gas, from contaminants. Although the phrases "gas stream," "vapor stream," and "liquid stream," refer to situations where a gas, vapor, and liquid is mainly present in the stream, respectively, there may be other phases also present within the stream. For example, a gas may also be present in a "liquid stream." In some instances, the terms "gas stream" and "vapor stream" may be used interchangeably. As referenced in this application, the term "stream" may be interchangeably referred to as a "feed stream."

The disclosure relates to a system and method for startup of a distillation tower. The system and method helps optimally connect a lower section of the distillation tower to an upper section of the distillation tower during startup of the distillation tower such that the distillation tower achieves the appropriate temperature and/or composition profiles for the stream in the lower and upper sections of the distillation tower at the end of startup. The system and method helps optimally connect the lower section and the upper section without allowing migration of solids outside of a middle controlled freeze zone section of the distillation tower and/or without undue accumulation of solids within the middle controlled freeze zone section. FIGS. 1-4 of the disclosure display various aspects of the system and method.

Figure 2:
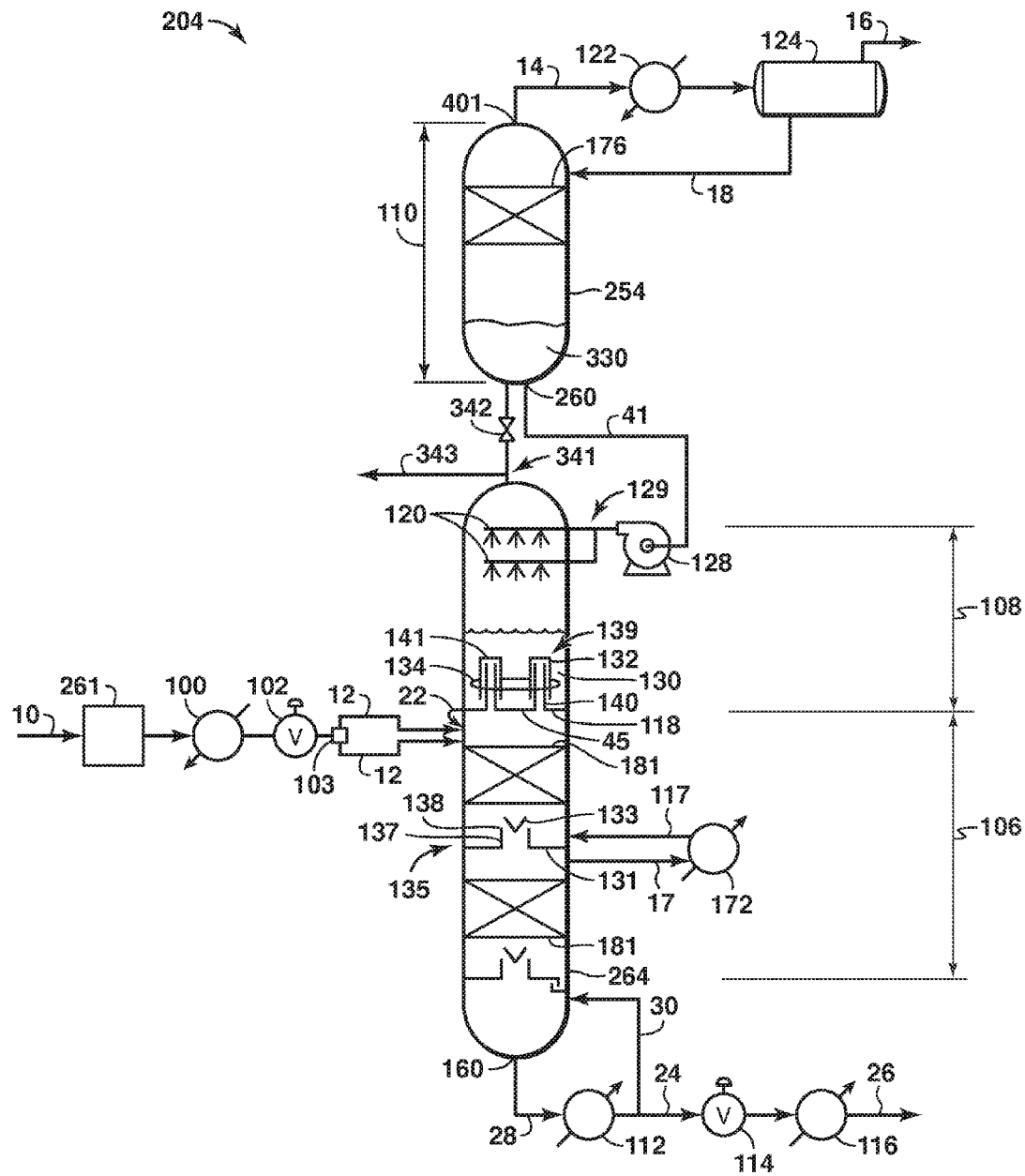
FIG. 2 is a schematic diagram of a distillation tower.
Figure 3:
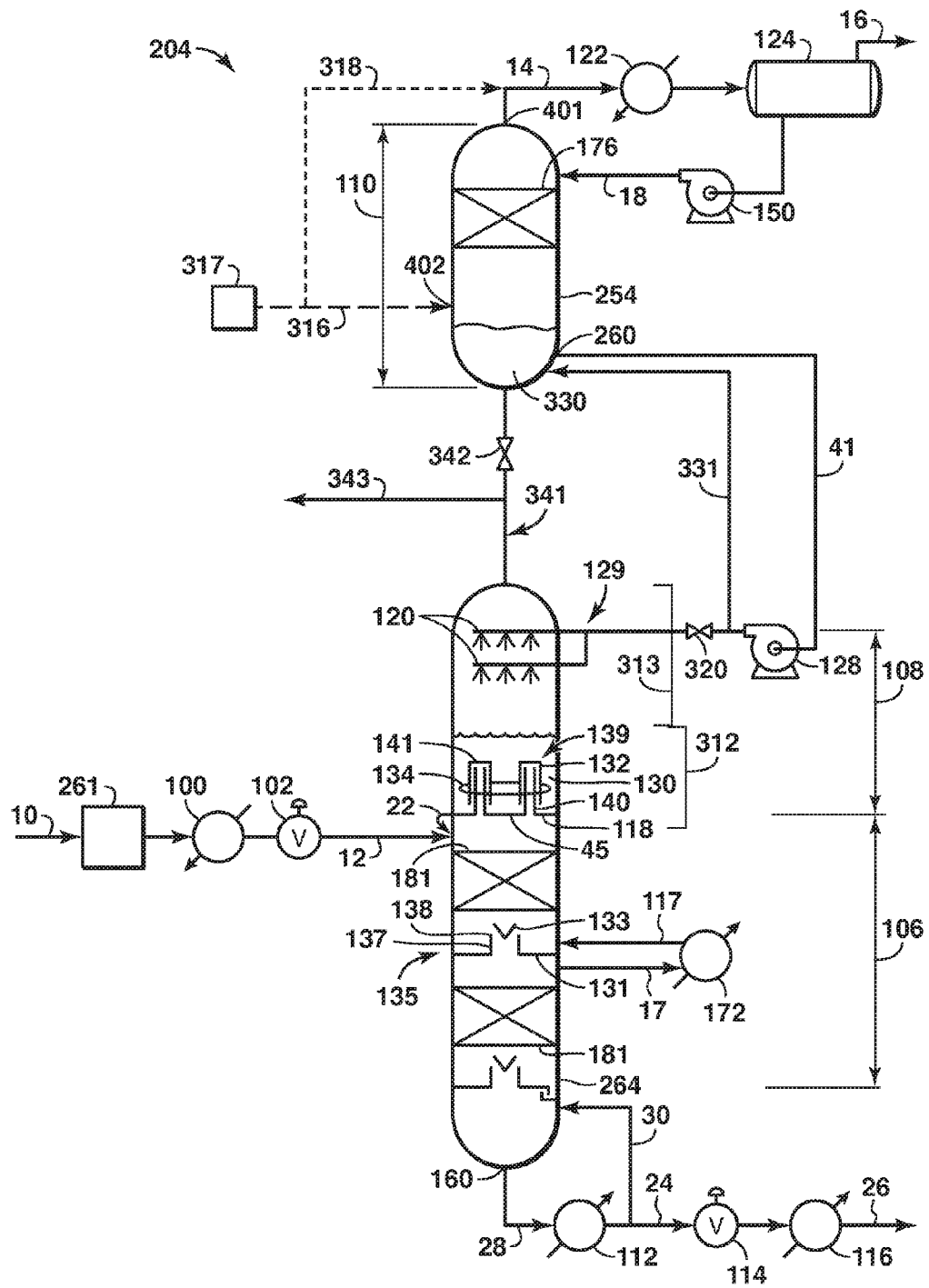
FIG. 3 is a schematic diagram of a distillation tower during startup.

The system comprises a distillation tower 204 (FIGS. 1-3). The distillation tower 204 may separate contaminants in a feed stream 10 from methane in a feed stream 10.

The distillation tower 204 may comprise an upper section 254 and a lower section 264. The upper section 254 may comprise a rectifier section 110. The lower section 264 may comprise a middle controlled freeze zone section 108 and a stripper section 106. The middle controlled freeze zone section 108 may comprise an upper portion of the lower section 264. The stripper section 106 may comprise a lower portion 106 (FIG. 3) of the lower section 264. The lower section 264 may be configured to form solids from contaminants within a stream that enters the distillation tower 204.

The distillation tower 204 may be referred to as a split-tower configuration because it comprises the upper section 254 and the lower section 264. The split-tower configuration may be beneficial in situations where, for example, the height of the distillation tower, motion considerations, and/or transportation issues, such as for remote locations, need to be considered. The split-tower configuration allows for the independent operation of the upper section 254 from the lower section 264 during startup of the distillation tower or during normal operation of the distillation tower. Normal operation of the distillation tower occurs after startup of the distillation tower.

The stripper section 106 is constructed and arranged to separate the feed stream 10 into an enriched contaminant bottom liquid stream (i.e., liquid stream) and a freezing zone vapor stream (i.e., vapor stream). The stripper section 106 separates the feed stream at a temperature and pressure at which no solids form. The liquid stream may comprise a greater quantity of contaminants than of methane. The vapor stream may comprise a greater quantity of methane than of contaminants. In any case, the vapor stream is lighter than the liquid stream. As a result, the vapor stream rises within the stripper section 106 (i.e., rises toward the top of the stripper section 106) and the liquid stream falls within the stripper section 106 (i.e., falls toward the bottom of the stripper section 106). The top of the stripper section 106 is the part of the stripper section 106 closest to the middle controlled freeze zone section 108.

The stripper section 106 may include and/or connect to equipment that separates the feed stream. The equipment may comprise any suitable equipment for separating methane from contaminants, such as one or more packed sections 181, or one or more distillation trays with perforations downcomers and weirs, and/or one or more chimney assemblies 135 (FIGS. 1-3). The equipment may comprise components that apply heat to the stream to form the vapor stream and the liquid stream. For example, the equipment may comprise at least one of a first reboiler 112 and a second reboiler 172 that apply heat to the stream. Each of the first reboiler 112 and the second reboiler 172 may be located outside of the distillation tower 204. The first reboiler 112 may comprise a plurality of first reboilers. The second reboiler 172 may comprise a plurality of second reboilers.

The first reboiler 112 may apply heat to the liquid stream that exits the stripper section 106 through a liquid outlet 160 of the stripper section 106. The liquid stream may travel from the liquid outlet 160 through line 28 to reach the first reboiler 112 (FIGS. 1-3). The amount of heat applied to the liquid stream by the first reboiler 112 can be increased to separate more methane from contaminants. The more heat applied by the reboiler 112 to the stream, the more methane separated from the liquid contaminants, though more contaminants will also be vaporized.

The first reboiler 112 may apply heat to the stream within the distillation tower 204. Specifically, the heat applied by the first reboiler 112 warms up the stripper section 106. This heat travels up the stripper section 106 and supplies heat to warm solids entering a melt tray assembly 139 (FIGS. 1-3) of the middle controlled freeze zone section 108 so that the solids form a liquid and/or slurry mix.

The second reboiler 172 applies heat to the stream within the stripper section 106. This heat is applied closer to the middle controlled freeze zone section 108 than the heat applied by the first reboiler 112. As a result, the heat applied by the second reboiler 172 reaches the middle controlled freeze zone section 108 faster than the heat applied by the first reboiler 112. The second reboiler 172 also helps with energy integration. Line 17 may lead from the distillation tower to the second reboiler 172. Line 117 may lead from the second reboiler 172 to the distillation tower.

While falling to the bottom of the stripper section 106, the liquid stream may encounter one or more of the chimney assemblies 135.

Each chimney assembly 135 may include a chimney tray 131. A liquid stream falling to the bottom of the stripper section 106, may encounter a chimney assembly 135. The liquid stream may collect on the chimney tray 131. The liquid stream that collects on the chimney tray 131 may be fed to the second reboiler 172. After the liquid stream is heated in the second reboiler 172, the stream may return to the middle controlled freeze zone section 108 to supply heat to the middle controlled freeze zone section 108 and/or the melt tray assembly 139 in the middle controlled freeze zone section 108. Unvaporized stream exiting the second reboiler 172 may be fed back to the distillation tower 204 below the chimney tray 131. Vapor stream exiting the second reboiler 172 may be routed under or above the chimney tray 131 when the vapor stream enters the distillation tower 204.

The chimney tray 131 may include one or more chimneys 137. Each chimney 137 serves as a channel that the vapor stream in the stripper section 106 traverses. The vapor stream travels through an opening in the chimney tray 131 at the bottom of the chimney 137 to the top of the chimney 137. The opening of the chimney tray 131 is closer to the bottom of the stripper section 106 than it is to the bottom of the middle controlled freeze zone section 108. The top of the chimney tray 131 is closer to the bottom of the middle controlled freeze zone section 108 than it is to the bottom of the stripper section 106.

Each chimney 137 has attached to it a chimney cap 133. The chimney cap 133 covers a chimney top opening 138 of the chimney 137. The chimney cap 133 prevents the liquid stream from entering the chimney 137. The vapor stream exits the chimney assembly 135 via the chimney top opening 138.

After falling to the bottom of the stripper section 106, the liquid stream exits the distillation tower 204 through the liquid outlet 160. The liquid outlet 160 is within the stripper section 106 (FIGS. 1-3). The liquid outlet 160 may be located at the bottom of the stripper section 106.

After exiting through the liquid outlet 160, the feed stream may travel via line 28 to the first reboiler 112. The feed stream may be heated by the first reboiler 112 and vapor may then re-enter the lower section 106 through line 30. The feed stream not vaporized by the first reboiler 112 (i.e., the unvaporized liquid) may continue out of the distillation process via line 24. The unvaporized liquid may not re-enter the distillation tower 204.

The middle controlled freeze zone section 108 is constructed and arranged to separate the stream introduced into the middle controlled freeze zone section into solids and a vapor stream. The middle controlled freeze zone section 108 forms the solids. The solids may be comprised more of contaminants than of methane. The vapor stream (i.e., methane-enriched vapor stream) may comprise more methane than contaminants. The middle controlled freeze zone section 108 may receive the vapor stream that rises from the stripper section 106.

The middle controlled freeze zone section 108 may comprise the melt tray assembly 139. The melt tray assembly 139 may be constructed and arranged to melt solids formed in the middle controlled freeze zone section 108. When the vapor stream rises from the stripper section 106 to the middle controlled freeze zone section 108, the vapor stream immediately encounters the melt tray assembly 139 and supplies heat to melt the solids. The melt tray assembly 139 may comprise at least one of a melt tray 118, a bubble cap 132, a liquid 130 and heat mechanism 134.

The melt tray 118 may collect a liquid 130 that helps melt the solids formed in the middle controlled freeze zone section 108. The melt tray 118 divides at least a portion of the middle controlled freeze zone section 108 from the stripper section 106. The melt tray 118 is at the bottom 45 of the middle controlled freeze zone section 108 (FIGS. 1-3).

The bubble cap 132 may act as a channel for the vapor stream rising from the stripper section 106 to the middle controlled freeze zone section 108. The bubble cap 132 may provide a path for the vapor stream that forces the vapor stream up a riser 140 and then down and around the riser 140 to the melt tray 118. The riser 140 is covered by a cap 141. The cap 141 prevents the liquid 130 from travelling into the riser and it also helps prevent solids from travelling into the riser 140. The vapor stream's traversal through the bubble cap 132 allows the vapor stream to transfer heat to the liquid 130 within the melt tray assembly 139.

The heat mechanism 134 may heat up the liquid 130 within the melt tray assembly 139 to facilitate melting of the solids into a liquid and/or slurry mix. The heat mechanism 134 may be located anywhere within the melt tray assembly 139. For example, as shown in FIGS. 1-3, a heat mechanism 134 may be located around the bubble caps 132. The heat mechanism 134 may be any suitable mechanism, such as a heat coil. The heat source of the heat mechanism 134 may be any suitable heat source.

The liquid 130 in the melt tray assembly is heated by the vapor stream rising from the stripper section 106. The liquid 130 may also be heated by the heat mechanism 134. The heat transferred by the vapor stream and/or the heat mechanism heats up the liquid, thereby enabling the heat to melt the solids.

The middle controlled freeze zone section 108 may comprise a spray assembly 129 (FIGS. 1-3). The spray assembly 129 cools the vapor stream that rises from a lower middle controlled freeze zone section 312 (FIG. 3) of the middle controlled freeze zone section 108. The lower middle controlled freeze zone section 312 is below an upper middle controlled freeze zone section 313 (FIG. 3) of the middle controlled freeze zone section 108. The spray assembly 129 sprays liquid, which is cooler than the vapor stream, on the vapor stream to cool the vapor stream. A portion of the spray assembly 129 may be within the upper middle controlled freeze zone section 313. The spray assembly 129 is not within the lower middle controlled freeze zone section 312. The spray assembly 129 is above the melt tray assembly 139. The melt tray assembly 139 is below the spray assembly 129. The temperature in the middle controlled freeze zone section 108 cools down as the vapor stream travels from the lower middle controlled freeze zone section 312 to the upper middle controlled freeze zone section 313.

The spray assembly 129 may include a spray nozzle 120 (FIGS. 1-3). The spray nozzle 120 sprays liquid on the rising vapor stream. The spray assembly 129 may include a spraying mechanism. The spraying mechanism may include a spray pump 128 (FIGS. 1-3) to pump the liquid or gravity to induce flow in the liquid. The spray pump 128 may be outside of the distillation tower 204.

The liquid sprayed by the spray assembly 129 contacts the vapor stream rising in the middle controlled freeze zone section 108 at a temperature and pressure at which solids form. Solids, containing mainly contaminants, form when the liquid sprayed contacts the vapor stream. The solids formed, fall toward the melt tray assembly 139 to interact with the liquid 130.

The solids form the liquid and/or slurry mix when in the liquid 130. The liquid and/or slurry mix flows from the middle controlled freeze zone section 108 to the stripper section 106. The liquid and/or slurry mix flows from the lower middle controlled freeze zone section 312 to the top of the stripper section 106 via a line 22 (FIGS. 1-3). The line 22 may be an exterior line. The line 22 may extend from the distillation tower 204. The line 22 may extend from the middle controlled freeze zone section 108. The line may extend to the stripper section 106. The line 22 may extend from an outer surface of the distillation tower 204.

The rectifier section 110 operates at a temperature and pressure and contaminant concentration at which no solids form. The rectifier section 110 is constructed and arranged to cool a vapor stream introduced into the rectifier section 110. The cooling of the stream separates any contaminants in the vapor stream from methane in the vapor stream. Reflux in the rectifier section 110 cools the vapor stream. The reflux is introduced into the rectifier section 110 via line 18 (FIGS. 1-3). Line 18 may extend to the rectifier section 110. Line 18 may extend from an outer surface of the distillation tower 204.

After contacting the reflux in the rectifier section 110, the feed stream forms a vapor stream and a liquid stream. The vapor stream comprises more methane than contaminants. The vapor stream rises in the rectifier section 110 and the liquid stream falls to a bottom of the rectifier section 110.

The rectifier section 110 may include a mass transfer device 176 (FIGS. 1-3). The mass transfer device may facilitate separation of the methane from the contaminants when the stream contacts the reflux. The mass transfer device 176 helps separate the methane from the contaminants. The mass transfer device 176 may comprise any suitable separation device, such as a tray with perforations, or a section of random or structured packing 176 to facilitate contact of the vapor and liquid phases.

After rising to a top portion of the rectifier section 110, the vapor stream may exit the rectifier section 110 of the distillation tower 204 via the rectifier section outlet 401 (FIGS. 1-3) through outlet line 14 (FIGS. 1-3). The line 14 (i.e., rectifier section outlet line) may emanate from an upper part of the rectifier section 110. The line 14 may extend from an outer surface of the rectifier section 110.

From line 14, the vapor stream may enter a condenser 122 (FIGS. 1-3). The condenser 122 cools the vapor stream to form a cooled stream. The condenser 122 at least partially condenses the stream.

After exiting the condenser 122, the cooled stream may enter a separator 124 (FIGS. 1-3). The separator 124 separates the cooled stream into a liquid stream and a vapor stream. The separator may be any suitable separator that can separate a stream into a liquid stream and a vapor stream, such as a reflux drum.

Once separated, the vapor stream may exit the separator 124 as sales product. The sales product may travel through line 16 (FIGS. 1-3) for subsequent sale to a pipeline and/or condensation to be liquefied natural gas. The vapor stream only exits the separator 124 as sales product if the contaminants within the vapor stream are below a certain amount such as, for example, less than 2% of the stream.

Once separated, the liquid stream may return to the rectifier section 110 through line 18 as the reflux. The reflux may travel to the rectifier section 110 via any suitable mechanism, such as a reflux pump 150 (FIGS. 1 and 3) or gravity.

The liquid stream (i.e., freezing zone liquid stream) that falls to the bottom of the rectifier section 110 collects at the bottom of the rectifier section 110 as liquid 330 (FIGS. 1-3). The liquid 330 may collect at the bottommost portion of the rectifier section 110.

During startup within the distillation tower 204, the rectifier section 110 does not connect to the lower section 264 of the distillation tower 204. The rectifier section 110 connects to the lower section 264 when (1) the amount of liquid 130 in the melt tray assembly 139 is greater than or equal to a predetermined melt tray amount and (2) the amount of contaminants within the vapor stream exiting the upper portion of the lower section 264 is within a predetermined concentration. Once the rectifier section 110 connects to the lower section 264, the distillation tower 204 operates under normal operation. In other words, during normal operation, the rectifier section 110 connects to the lower section 264.

Figure 4:
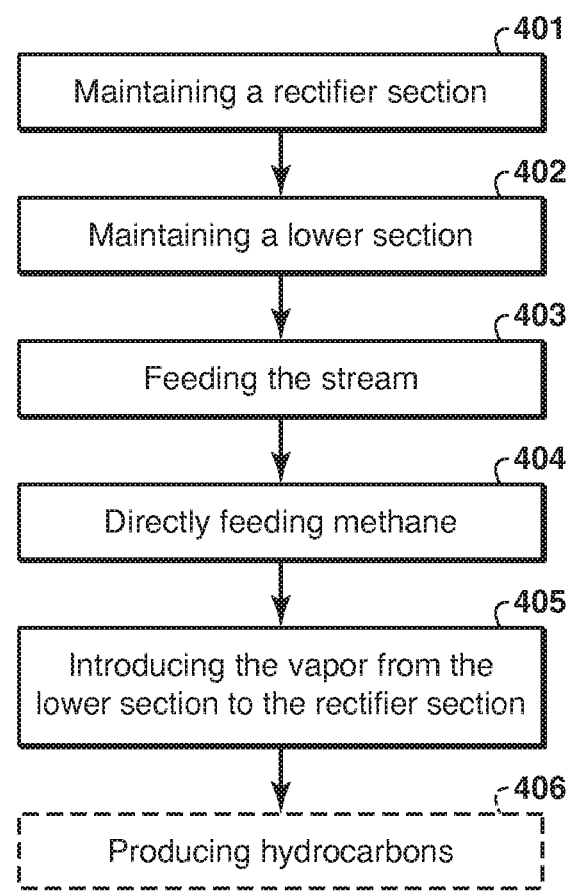
FIG. 4 is a flowchart of a method within the present disclosure.

During startup, the rectifier section 110 and the lower section 264 are maintained, 401 (FIG. 4), 402 (FIG. 4). During startup, stream 10 is fed to the lower section 264 of the distillation tower 204, 403 (FIG. 4). The middle controlled freeze zone section 108 may also be maintained.

During startup, methane is directly fed to at least one of the rectifier section 110 and the rectifier section outlet line 14 of the rectifier section 110 when a contaminant concentration of the contaminant in a vapor stream exiting as a vapor in the upper portion of the lower section 264 is outside of a predetermined concentration, 404 (FIG. 4). Methane is fed directly when the contaminant concentration is outside of the predetermined concentration to enable the portions of the distillation tower 204 (stripper section 106, middle controlled freeze zone section 108 and rectifier section 110) to have the appropriate amount of contaminant for the distillation tower 204 to operate during normal operations.

When the methane is directly fed to the rectifier section 110, the methane may be directly fed to a rectifier section inlet 402 (FIG. 3) of the rectifier section 110. The rectifier section inlet 402 (FIG. 3) may connect to line 316 (FIG. 3). Line 316 may extend to the rectifier section 110 such that the methane travels to the rectifier section inlet 402 (FIG. 3) via line 316.

Methane may be fed directly to the rectifier section outlet line 14 of the rectifier section 110 via line 318 (FIG. 3). Line 318 may extend to the rectifier section outlet line 14 such that the methane travels to the rectifier section outlet line 14 via line 318. After being fed to the rectifier section outlet line 14, the methane may enter the condenser 122 and then the separator 124 and then be fed to the rectifier section 110 via reflux pump 150.

Once the contaminant concentration exiting as the vapor stream is within the predetermined concentration, methane need not be directly fed to the rectifier section 110. The contaminant exiting as the vapor in the upper portion of the lower section 264 is the vapor exiting a top portion of the middle controlled freeze zone section 108. The contaminant exiting as the vapor in the upper portion of the lower section 264 is not the vapor exiting the stripper section 106 to enter the middle controlled freeze zone section 108 from the stripper section 106. Directly feeding the methane to the rectifier section 110 may comprise discontinuously directly feeding the methane or continuously feeding the methane.

The predetermined concentration is any suitable range. For example, the predetermined concentration is between 2 and 7 percent of contaminants within a stream. More specifically, the predetermined concentration may be between 3 and 6 percent of contaminants within a stream. If the contaminant concentration is within the predetermined concentration, the contaminant concentration falls within the suitable range. If the contaminant concentration is outside of the predetermined concentration, the contaminant concentration falls outside of the suitable range. For example, if the predetermined concentration is between 2 and 7 percent, a contaminant concentration equal to 8% falls outside of the suitable range and a contaminant concentration of 4% falls within the suitable range. The contaminant concentration is the total percentage of contaminant within the vapor stream exiting the upper portion of the lower section 264. The contaminant comprises carbon dioxide. The predetermined concentration may be any percentage within a range that includes or is bounded by any of the preceding examples.

The methane fed directly to at least one of the rectifier section 110 via line 316 and the rectifier section outlet line 14 via line 318 may come from any suitable source. For example, the methane may come from a housing mechanism 317 (FIG. 3). The housing mechanism 317 may be filled with methane. The methane may be in vapor form. The housing mechanism 317 may be any suitable mechanism. For example, the housing mechanism 317 may comprise one of a storage unit and a pipeline.

When the methane is fed directly to the rectifier section 110, the vapor stream rises and exits the rectifier section 108 to line 14. Regardless of whether the methane is fed directly to at least one of the rectifier section 110 and the rectifier section outlet line 14, from line 14, the vapor stream enters the condenser 122 and is cooled. From the condenser 122 the methane enters the separator 124 where the cooled methane is separated into a vapor stream and a liquid stream. The liquid stream reenters the rectifier section via line 18. After reentering the rectifier section via line 18, the liquid within the liquid stream falls to the bottom of the rectifier section 110 as liquid 330. Any vapor within the liquid stream rises and exits the rectifier section 108 via line 14.

The liquid stream that falls to the bottom of the rectifier section 110 accumulates as the liquid 330. The liquid 330 is discontinuously fed from the rectifier section 110 to the lower section 264 while the melt tray amount of liquid 130 in the melt tray assembly 139 is below (i.e., less than) a predetermined melt tray amount. Discontinuously feeding the spray includes discontinuously introducing the spray from the rectifier section 110 to the spray assembly 129 in the lower section 264. Discontinuously feeding the spray occurs before introducing vapor from the lower section 264 to the rectifier section 110. The liquid 330 is continuously fed from the rectifier section 110 to the lower section 264 when the amount of liquid 130 is greater than or equal to (i.e., at least) the predetermined melt tray amount. Continuously feeding the spray includes continuously feeding the spray from the rectifier section 110 to the spray assembly 129 in the lower section 264. Continuously feeding the spray may occur before introducing the vapor from the lower section 264 to the rectifier section 110.

The predetermined melt tray amount is an amount sufficient to provide a sufficient warm thermal mass to reliably melt all solids that enter the liquid 130 in the melt tray assembly 139. When the liquid level of the melt tray amount is at least at this predetermined melt tray amount, it is more likely that the middle controlled freeze zone section 108 will operate properly by forming solids and vapors and melting the solids in the melt tray assembly 139, such that the methane in the feed stream is separated out from the contaminants in the feed stream.

The liquid stream exiting the rectifier section 110 may be fed to a line 41 that connects to a flow controlling device 320 and to the spraying mechanism. The liquid stream may exit the rectifier section 110 via outlet 260. The flow controlling device 320 is configured to open and close. When the flow controlling device 320 is open, the liquid stream is fed to the lower section 264. When the flow controlling device 320 is open, some of the liquid stream may be fed to the rectifier section 110 via flow back line 331 (FIG. 3). When the flow controlling device 320 is closed, the liquid stream is not fed to the lower section 264. When the flow controlling device 320 is closed, some of the liquid stream may be fed to the rectifier section 110 via flow back line 331. The flow controlling device 320 may comprise any suitable device. For example, the flow controlling device 320 may comprise a valve.

The line 41 may also connect to a holding vessel. The holding vessel may house at least some of the liquid stream before it encounters the spraying mechanism. The holding vessel may be needed when there is not a sufficient amount of the liquid 330 at the bottom of the rectifier section 110 to feed the spraying mechanism.

Once the liquid stream is fed to the lower section 264 via line 41, the liquid stream is sprayed on the vapor stream rising in the middle controlled freeze zone section 108 to help form solids and a vapor stream. The solids fall to the bottom of the middle controlled freeze zone section 108 and are melted in the melt tray assembly 139. The melted solids that turn into liquid increase the amount of liquid 130 in the melt tray assembly 139. Increasing the amount of liquid 130 helps the liquid 130 be greater than or equal to the predetermined melt tray amount.

When the amount of liquid 130 in the melt tray assembly is below the predetermined melt tray amount, the liquid stream is discontinuously fed to the lower section 264; when the amount of liquid 130 in the melt tray assembly is greater than or equal to (i.e., at least) the predetermined melt tray amount, the liquid stream is continuously fed to the lower section 264. The flow controlling device 320 is the mechanism by which the liquid stream is discontinuously or continuously fed. When the amount of liquid 130 is below the predetermined melt tray amount (i.e., less than the predetermined melt tray amount), the flow controlling device 320 continuously goes from being open to being closed so that the liquid stream is discontinuously fed to the lower section. In other words, when the flow controlling device 320 is open the liquid stream is fed to the lower section 264 and when the flow controlling device 320 is closed the liquid stream is not fed to the lower section 264. When the amount of liquid 130 is greater than or equal to the predetermined melt tray amount, the flow controlling device 320 remains open so that the liquid stream is not prevented from being fed to the lower section 264 (i.e., the liquid stream is continuously fed to the lower section 264). Excess liquid 130 is transferred to the stripper section 106 of the lower section 264 via line 22.

The vapor stream formed from the liquid stream sprayed rises to the top of the middle controlled freeze zone section 108 and exits the middle controlled freeze zone section 108 via line 341 (FIGS. 1-3). Line 341 extends from the middle controlled freeze zone section 108 of the lower section 264 to the rectifier section 110 of the upper section 254. Line 341 includes a flow controlling device 342. The flow controlling device 342 is configured to prevent the vapor stream from being fed to the upper section 254 when the contaminant concentration, in the vapor stream, exiting an upper portion of the lower section 264 is outside of the predetermined concentration. The flow controlling device 342 may be any suitable device that is so configured. For example, the flow controlling device 342 may comprise a valve. If the flow controlling device 342 comprises a valve, the valve is open when the contaminant concentration exiting the upper portion of the lower section 264 is within the predetermined concentration. If the flow controlling device 342 comprises a valve, the valve is closed when the contaminant concentration exiting the upper portion of the lower section 264 is outside of the predetermined concentration. Regardless of what the flow controlling device 342 comprises, the flow controlling device 342 is open when the contaminant concentration exiting the upper portion of the lower section 264 is within the predetermined concentration; the flow controlling device is closed when the contaminant concentration exiting the upper portion of the lower section 264 is outside of the predetermined concentration.

When the contaminant concentration exiting the upper portion of the lower section 264 is outside of the predetermined concentration, the vapor stream in line 341 may be disposed of in any suitable manner via a disposal method. For example, the disposal method could be that the vapor stream is sent to flare. The vapor stream may be disposed of by being fed through line 343 to the disposal method. When the contaminant concentration exiting the upper portion of the lower section 264 is within the predetermined concentration, the vapor from the lower section 264 is fed to the rectifier section 110, 405 (FIG. 4).

It may take longer for the contaminant concentration to be within the predetermined concentration than for the melt tray amount of liquid 130 in the melt tray assembly 139 to be greater than or equal to the predetermined melt tray amount (i.e., not below the predetermined melt tray amount). When it takes longer, the liquid stream (i.e., spray) is continuously fed to the lower section 264 before the vapor in the vapor stream is introduced (i.e., fed) from the lower section 264 to the rectifier section 110.

Before the rectifier section 110 connects to the lower section 264, feed stream entering the lower section 264 may enter the lower section 264 at a lower rate than the rate at which the feed stream enters the lower section 264 during normal operation. Once the rectifier section 110 connects to the lower section 264, the feed stream entering can be adjusted to the desired operating rate.

During startup or normal operation of the distillation tower 204, the system may include a heat exchanger 100 (FIGS. 1-3). The feed stream 10 may enter the heat exchanger 100 before entering the distillation tower 204. The feed stream 10 may be cooled within the heat exchanger 100. The heat exchanger 100 helps drop the temperature of the feed stream 10 to a level suitable for introduction into the distillation tower 204.

During startup or normal operation, the system may include an expander device 102 (FIGS. 1-3). The feed stream 10 may enter the expander device 102 before entering the distillation tower 204. The feed stream 10 may be expanded in the expander device 102 after exiting the heat exchanger 100. The expander device 102 helps drop the temperature of the feed stream 10 to a level suitable for introduction into the distillation tower 204. The expander device 102 may be any suitable device, such as a valve. If the expander device 102 is a valve, the valve may be any suitable valve that may aid in cooling the feed stream 10 before it enters the distillation tower 204. For example, the valve 102 may comprise a Joule-Thompson (J-T) valve.

During startup or normal operation, the system may include a feed separator 103 (FIG. 2). The feed stream may enter the feed separator before entering the distillation tower 204. The feed separator may separate a feed stream having a mixed liquid and vapor stream into a liquid stream and a vapor stream. Lines 12 may extend from the feed separator to the distillation tower 204. One of the lines 12 may receive the vapor stream from the feed separator. Another one of the lines 12 may receive the liquid stream from the feed separator. Each of the lines 12 may extend to the same and/or different portions (i.e. middle controlled freeze zone, and stripper section) of the lower section 264. The expander device 102 may or may not be downstream of the feed separator 103. The expander device 102 may comprise a plurality of expander devices 102 such that each line 12 has an expander device 102.

During startup or normal operation, the system may include a dehydration unit 261 (FIGS. 1-3). The feed stream 10 may enter the dehydration unit 261 before entering the distillation tower 204. The feed stream 10 enters the dehydration unit 261 before entering the heat exchanger 100 and/or the expander device 102. The dehydration unit 261 removes water from the feed stream 10 to prevent water from later presenting a problem in the heat exchanger 100, expander device 102, feed separator 103, or distillation tower 204. The water can present a problem by forming a separate water phase (i.e., ice and/or hydrate) that plugs lines, equipment or negatively affects the distillation process. The dehydration unit 261 dehydrates the feed stream to a dew point sufficiently low to ensure a separate water phase does not form at any point downstream during the rest of the process. The dehydration unit may be any suitable dehydration mechanism, such as a molecular sieve or a glycol dehydration unit.

During startup or normal operation, the system may include a filtering unit (not shown). The feed stream 10 may enter the filtering unit before entering the distillation tower 204. The filtering unit may remove undesirable contaminants from the feed stream before the feed stream enters the distillation tower 204. Depending on what contaminants are to be removed, the filtering unit may be before or after the dehydration unit 261 and/or before or after the heat exchanger 100.

During startup or normal operation, the system may include lines 12. Each of the lines may be referred to as an inlet channel 12. The feed stream is introduced into the distillation tower 204 through one of the lines 12. One or more lines 12 may extend to the stripper section 106 or the middle controlled freeze zone section 108 of the lower section 264. For example, the line 12 may extend to the stripper section 106 such that the feed stream 10 may enter the stripper section 106 (FIGS. 1-3). Each line 12 may directly or indirectly extend to the stripper section 106 or the middle controlled freeze zone section 108. Each line 12 may extend to an outer surface of the lower section 264 before feed stream enters the lower section 264.

During startup or normal operation, and before entering the distillation tower 204, a sample of the feed stream 10 may enter an analyzer (not shown). The sample of the feed stream 10 may be a small sample of the feed stream 10. The feed stream 10 may comprise feed from multiple feed sources or feed from a single feed source. Each feed source may comprise, for example, a separate reservoir, one or more wellbores within one or more reservoirs, etc. The analyzer may determine the percentage of $CO_2$ in the sample of the feed stream 10 and, therefore, the content of $CO_2$ in the feed stream 10. The analyzer may connect to multiple lines 12 so that the feed stream 10 can be sent to at least one of the stripper section 106 and the middle controlled freeze zone section 108 after the sample of the feed stream 10 exits the analyzer. If the analyzer determines that the percentage of $CO_2$ is greater than about 20% or greater than 20%, the analyzer may direct the feed stream to the line 12 extending from the stripper section 106. If the analyzer determines that the percentage of $CO_2$ is less than about 20% or less than 20%, the analyzer may direct the feed stream to the line 12 extending from the middle controlled freeze zone section 108. The analyzer may be any suitable analyzer. For example, the analyzer may be a gas chromatograph or an IR analyzer. The analyzer may be positioned before the feed stream 10 enters the heat exchanger 100. The feed stream 10 entering the analyzer may be a single phase.

While the feed stream 10 may be introduced into the stripper section 106 or the middle controlled freeze zone section 108 regardless of the percentage of $CO_2$ in the feed stream 10, it is more efficient to introduce the feed stream 10 into the section of the distillation tower 204 that will employ the best use of energy. For this reason, it is preferable to introduce the feed stream to the stripper section 106 when the percentage of $CO_2$ in the feed stream is greater than any percentage about 20% or greater than 20% and to the middle controlled freeze zone section 108 when the percentage of $CO_2$ in the feed stream is any percentage less than about 20% or less than 20%.

During startup or normal operation, the system may include an expander device 114 (FIGS. 1-3). After unvaporized liquid continues out of the distillation process via line 24, the heated liquid stream may be expanded in the expander device 114. The expander device 114 may be any suitable device, such as a valve. The valve 114 may be any suitable valve, such as a J-T valve.

During startup or normal operation, the system may include a heat exchanger 116 (FIGS. 1-3). The liquid stream expanded in the expander device 114 may be cooled or heated by the heat exchanger 116. The heat exchanger 116 may be a direct heat exchanger or an indirect heat exchanger.

The heat exchanger 116 may comprise any suitable heat exchanger. The liquid stream may exit the heat exchanger 116 through line 26.

During normal operation, the methane in the vapor stream that rises to the top of the middle controlled freeze zone section 108 is fed from the middle controlled freeze zone section 108 to the rectifier section 110. Some contaminants may remain in the methane and also rise. The vapor stream is fed from the middle controlled freeze zone section 108 to the rectifier section 110 because the flow controlling device 342 is open.

It is important to note that the steps depicted in FIG. 4 are provided for illustrative purposes only and a particular step may not be required to perform the inventive methodology. The claims, and only the claims, define the inventive system and methodology.

Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. The disclosed methodologies and techniques may be used to produce hydrocarbons in a feed stream extracted from, for example, a subsurface region. The feed stream extracted may be processed in the distillation tower 204 and separated into hydrocarbons and contaminants. The separated hydrocarbons exit the middle controlled freeze zone section 108 or the rectifier section 110 of the distillation tower. Some or all of the hydrocarbons that exit may be produced 406 (FIG. 4). Hydrocarbon extraction may be conducted to remove the feed stream from for example, the subsurface region, which may be accomplished by drilling a well using oil well drilling equipment. The equipment and techniques used to drill a well and/or extract the hydrocarbons are well known by those skilled in the relevant art. Other hydrocarbon extraction activities and, more generally, other hydrocarbon management activities, may be performed according to known principles.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

It should be understood that numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

The articles "the", "a" and "an" are not necessarily limited to mean only one, but rather are inclusive and open ended so as to include, optionally, multiple such elements.

What is claimed is:

1. A method for startup of a distillation tower, the method comprising:
providing the distillation tower comprising a lower section and a rectifier section, wherein the lower section is configured to form solids from a contaminant within a stream that enters the distillation tower and wherein the lower section and rectifier section are configured such that a vapor rises from the lower section to the rectifier section through a first flow controlling device and such that liquid flows from the rectifier section to a spray assembly in the lower section through a second flow controlling device;
feeding the stream to the lower section;
maintaining the first flow controlling device in a closed position and directly feeding methane to at least one of the rectifier section and a rectifier section outlet line of the rectifier section when a contaminant concentration of the contaminant exiting as a vapor in an upper portion of the lower section is outside of a predetermined concentration;
discontinuously feeding spray from the rectifier section to the lower section when a melt tray amount of liquid in a melt tray assembly of the lower section is less than a predetermined melt tray amount;
opening the first flow controlling device and introducing the vapor from the lower section to the rectifier section when the contaminant concentration exiting the upper portion of the lower section is within the predetermined concentration; and
opening the second flow controlling device and continuously feeding spray from the rectifier section to the lower section when the amount of liquid in the melt tray assembly is greater than or equal to the predetermined melt tray amount.

2. The method of claim 1, further comprising:
producing hydrocarbons from the distillation tower.

3. The method of claim 1, wherein the predetermined concentration is between 2 and 7 percent.

4. The method of claim 1, wherein the predetermined concentration is between 3 and 6 percent.

5. The method of claim 1, further comprising discontinuing directly feeding methane to the rectifier section when the contaminant concentration exiting the upper portion of the lower section is within the predetermined concentration.

6. The method of claim 1, further comprising chilling the stream before the stream enters the lower section.

7. The method of claim 1, further comprising heating a stream exiting a lower portion of the lower section with a reboiler.

8. The method of claim 1, wherein discontinuously feeding spray comprises discontinuously introducing the spray from the rectifier section to the spray assembly in the lower section.

9. The method of claim 1, wherein discontinuously feeding spray occurs before opening the first flow controlling device and allowing the vapor from the lower section to enter the rectifier section.

10. The method of claim 1, wherein continuously feeding spray comprises continuously introducing the spray from the rectifier section to the spray assembly in the lower section.

11. The method of claim 1, wherein continuously feeding spray occurs before opening the first flow controlling device and allowing the vapor from the lower section to enter the rectifier section.

12. The method of claim 1, wherein the lower section comprises a middle controlled freeze zone section and a stripper section.

13. The method of claim 12, wherein the middle controlled freeze zone section comprises the upper portion of the lower section.

14. A distillation tower for startup, comprising:
a rectifier section;
a lower section comprising a spray assembly and a melt tray assembly and configured to form solid from contaminant within a stream, wherein the lower section and rectifier section are configured such that vapor rises from the lower section to the rectifier section through a first flow controlling device and such that liquid flows from the rectifier section to the spray assembly in the lower section through a second flow controlling device; and
a storage unit holding methane that fluidly connects to at least one of the rectifier section and a rectifier section outlet line of the rectifier section;
wherein the first flow controlling device is maintained in an open position such that the lower section introduces the contaminant exiting as a vapor from an upper portion of the lower section to the rectifier section when a contaminant concentration of the vapor exiting the upper portion of the lower section is within a predetermined concentration;
wherein the first flow controlling device is maintained in a closed position such that the lower section does not introduce the vapor from the lower section to the rectifier section when the contaminant concentration exiting the upper portion of the lower section is outside of the predetermined concentration; and
wherein the second flow controlling device opens and closes such that the lower section discontinuously receives spray from the rectifier section when a melt tray amount of liquid in the melt tray assembly is below a predetermined melt tray amount.

15. The method of claim 14, wherein the predetermined concentration is between 2 and 7 percent.

16. The method of claim 14, wherein the predetermined concentration is between 3 and 6 percent.

17. The method of claim 14, further comprising a chiller that chills the stream before the stream enters the lower section.

18. The method of claim 14, further comprising a reboiler that heats a stream that exits a lower portion of the lower section.

19. The method of claim 14, wherein the lower section continuously receives spray from the rectifier section when a melt tray amount of liquid in the melt tray assembly is greater than or equal to a predetermined melt tray amount.

20. The method of claim 14, wherein the lower section comprises a middle controlled freeze zone section and a stripper section.

21. The method of claim 20, wherein the middle controlled freeze zone section comprises the upper portion of the lower section.

* * * * *